United States Patent [19]

Herst et al.

[11] E Patent Number: Re. 33,593

[45] Reissued Date of Patent: May 21, 1991

[54] LUMINAIRE FOR INDIRECT LIGHTING

[75] Inventors: Douglas J. Herst, Ross; Peter Y. Y. Ngai, Lafayette, both of Calif.

[73] Assignee: Peerless Lighting Corporation, Berkeley, Calif.

[21] Appl. No.: 472,171

[22] Filed: Jan. 30, 1990

Related U.S. Patent Documents

Reissue of:

[64] Patent No.: 4,667,275
Issued: May 19, 1987
Appl. No.: 742,591
Filed: Jun. 7, 1985

U.S. Applications:

[63] Continuation of Ser. No. 46,970, Jun. 8, 1979, abandoned.

[51] Int. Cl.[5] ..... F21S 3/00

[52] U.S. Cl. ..... 362/223; 362/309; 362/337

[58] Field of Search ..... 362/217, 219, 223, 260, 362/307, 308, 309, 311, 327, 328, 329, 330, 335, 336, 337, 339, 340, 367

[56] References Cited

U.S. PATENT DOCUMENTS

| | | | |
|---|---|---|---|
| 2,474,341 | 6/1949 | Wince | 362/224 |
| 3,398,273 | 8/1968 | Rex et al. | 362/309 |
| 4,001,575 | 1/1977 | Sullivan et al. . | |
| 4,065,667 | 12/1977 | Ruud et al. | 362/217 |
| 4,097,918 | 6/1978 | Anderson et al. | 362/147 |
| 4,390,930 | 6/1983 | Herst et al. | 362/260 |

FOREIGN PATENT DOCUMENTS

| | | | |
|---|---|---|---|
| 216622 | 9/1957 | Australia | 362/337 |
| 235175 | 8/1961 | Australia | 362/340 |
| 240470 | 10/1964 | Fed. Rep. of Germany | 362/339 |
| 619084 | 3/1949 | United Kingdom | 362/340 |
| 924138 | 4/1963 | United Kingdom | 362/339 |

OTHER PUBLICATIONS

Peerless Electric Company, Photometric and Technical Information, Longlites by Peerless, 1977, pp. 82-95.

Electro-Systems, Inc., Power-Lume 800/1500, 1965, p. 5.

Holophane Company, Inc., Outdoor Substation Unit With Lens Top, D4252, 1966.

Holophane Company, Inc., Holophane 780, Expresslite TM, (date unknown).

*Primary Examiner*—David A. Okonsky

*Attorney, Agent, or Firm*—Donald L. Beeson

[57] ABSTRACT

A luminaire includes a source of light in an opaque housing which extends beneath the source and upwardly about the sides of the source to hide the source from direct view from a horizontal line of sight even with the source. A lens is mounted to the housing above the source and extending around to join with the upper edge of the housing. The lens includes an upper light-dispersing portion which diverges one portion and only displaces another portion of the light from the source to provide an even distribution of luminance to a ceiling above the source. The lens also includes a lateral light-bending portion which receives light from the source and fans it out laterally over the side of the housing to continue the uniform illumination pattern of the ceiling and to illuminate vertical surfaces in the vicinity of the luminaire. A reflector beneath the source directs light onto the lateral light-bending portion of the lens to at least partly compensate for the fact that the light passing through the lateral portion of the lens normally travels farther to the surface it is illuminating and also strikes any horizontal surface at an increased angle of incidence. The lens and housing cooperate to enclose the source of light to prevent dust from entering, and the lateral portion of the lens provides a visible source of light to a person in the room being illuminated.

29 Claims, 2 Drawing Sheets

LUMINAIRE FOR INDIRECT LIGHTING

Matter enclosed in heavy brackets [ ] appears in the original patent but forms no part of this reissue specification; matter printed in italics indicates the additions made by reissue.

This is a continuation of co-pending application Ser. No. 046,970 filed on June 8, 1979 now abandoned.

BACKGROUND AND SUMMARY

The present invention relates to a luminaire (i.e., the complete lighting unit); and more particularly, it relates to a luminaire which may be used for indirect lighting particularly in large open areas such as are commonplace in modern offices. As will be further explained below, one of the advantages of the invention is that its use is not limited only to open office areas, but rather, it can be carried through to the lighting of hallways, executive suites or conference rooms. However, the invention is particularly suited to provide illumination for typical office situations with efficient use of energy while having those characteristics which recent research has shown to be desirable from a psychological viewpoint.

Modern offices are characterized by large open spaces having a ceiling height normally about eight feet, but which may extend to nine feet. The space may be sectioned for privacy by movable wall partitions. These partitions normally have a height of about five to seven feet.

In considering the lighting requirements for an office, among the more important considerations are the need for individual task lighting, for example, for surfaces approximately two and half feet above the floor, and the need to provide some ambient lighting. The latter is desirable both from a safety standpoint and for psychological reasons, as will be discussed below.

Direct lighting as a source of lighting for offices provides high luminance for task areas, but in general, the quality of lighting is not good in terms of visibility and visual comfort of a person.

Lenses have been used in luminaires employing fluorescent lamps for direct lighting. One type of lens employs individual conical or spherical lenses in a repeating pattern. Another uses parabolic reflectors to direct light downwardly. In both of these systems, a light transmission pattern is created in which the light is directed downwardly and generally confined within an angle of about 45 degrees from the vertical. Further, neither of these systems provides ambient lighting for vertical surfaces which has been found to be a distinct preference and produces feelings of spaciousness and comfort.

Indirect lighting obviates the problem of glare perceived by an observer, but most indirect lighting systems have the disadvantage of collecting dust which gathers on the lamps and any reflectors beneath the lamps, and this is a major source of reduced luminance. Another disadvantage of most indirect lighting systems is a psychological one. Research has shown that human beings have a distinct preference for lighter rooms which are uniformly illuminated. In other words, a person may comfortably perform a task in an area at a relatively low luminance level provided there is a minimum of light available and the luminance pattern does not change substantially within his field of view. If the luminance level is substantially lower than that of the area from which a person enters, there will be a period of adaptation, but once the adjustment has been effected, there is little difficulty in performing tasks if the illumination meets the minimum requirements for the task. Further, people prefer to be able to see the source of light. It provides a sense of perspective and has been found to be a factor to be considered in providing office lighting. As indicated, most indirect lighting systems have as a principal object the generation of light while masking completely the origin of the light.

Lenses have in the past been placed above a source of light. Some of these lenses do not generate a pattern of illuminance above the luminaire which is uniform. Either a very bright spot is created above the luminaire (the more common characteristic), or a dark area is generated. In either case, the substantial variation in the illumination pattern on the ceiling is easily perceived and is undesirable. Further, in the case of the bright spot, inefficiency results because most of the light is reflected back to the luminaire rather than being used to light the room.

If a dark area is created on the ceiling, it is undesirable from an aesthetic as well as a psychological viewpoint because of the preferences mentioned above.

The luminaire of the present invention has as a principal object the provision of indirect lighting of large open office systems by achieving a uniform distribution of light (i.e. illumination pattern) on a ceiling over the luminaire as well as by fanning the light out laterally to extend the uniform luminance on the ceiling to adjacent areas not directly above the luminaire. Further, due to the reinforcement and bending of lateral rays, vertical surfaces are illuminated even at a substantial distance from the unit.

The luminaire includes an opaque housing beneath the source of light which preferably includes two or three fluorescent lamps placed side by side. The length of the lamps helps to distribute the light along the length of the housing.

A lens is mounted to the housing above the source, and in the illustrated embodiment, it includes a generally flat upper portion and lateral portions which curve downwardly and join to the housing to enclose the lamps. The upper portion of the lens includes a flat upper surface and a series of light-diverging prisms on the lower surface, facing the source of light. Adjacent prisms are spaced by a flat portion. The function of the prisms is to refract and diverge incident light, and the function of the flats is to permit incident light to pass between the prisms. The prisms and flats cooperate to provide a uniform pattern of luminance on a ceiling above the luminaire which normally has a high reflectance to provide good indirect lighting qualities. This uniformity is effective when the ceiling is placed about two to three feet above the upper surface of the lens and the effect persists even though the spacing is reduced to one foot.

A reflector is located beneath the light sources in the housing to direct light from the sources out to the lateral portions of the lens. Some of the reflected light is transmitted upwardly to the upper portion of the lens. In the illustrated embodiment there are two lateral lens portions, but only one is necessary, for example, if the luminaire is designed for placement directly on the side of a vertical wall. The lateral lens portion or portions are curved downwardly from the top lens portion to the upper edge of the housing, and they contain a plurality of external prisms extending the length of the lens.

The placement of the source of light in the housing is such that it cannot be seen directly by an observer having an eye level the same height as or slightly above the source. Further, because of the interposition of the lens, the light source cannot be seen directly from any elevation. The lateral lens portions bend the light from the source as well as the light from the reflectors toward the horizontal to "fan" the incident light and thereby extend the uniform pattern of luminance onto portions of the ceiling not directly above the luminaire. A pattern of luminance having substantial uniformity is thus achieved on the ceiling directly over-head and extending a few feet either side of the lens without creating bright spots which cause glare or dark areas on the ceiling, as characterized by some prior luminaires used for indirect lighting. Thus, luminaires of the present invention may be spaced at relatively wide distances if they are associated, for example, with movable wall panels since adjacent luminaires will both exhibit this fanning effect and achieve a luminance for indirect lighting which not only provides uniform ambient lighting but also more than adequate task lighting at the same time.

The fact that the light flux density diminishes as the distance between the luminaire and the point being illuminated increases as well as the fact that the flux density is reduced because the flux density in a plane perpendicular to the source is spread over an extended area for large angles of incidence (i.e. the angle relative to the normal), as is the case for areas not directly above the luminaire, are compensated by the effect of the reflector which routes most of the light from the bottom of the source toward the lateral lens portions, although some is transmitted to the top lens portion because of the size of the lamps. This, as well as the particular prism designs, disclosed below, cooperates to achieve a pattern of substantially uniform luminance which is highly desirable from a psychological standpoint and which achieves uniform task light as well as ambient lighting while reducing the amount of electricity to accomplish this in a large open office area.

The lateral lens portions of the luminaire transmit direct and reflected light from the source to illuminate vertical surfaces such as walls and provide a brighter ambient lighting.

Further, because the prisms on the curved lateral portion of the lens are on the exterior surface of the lens, they act to segment the incident light and provide a series of softly glowing lines of light which are perceptible to a person standing to the side of the luminaire, but without transmitting a direct image of the source. Thus, persons in a space illuminated by the present invention have the psychological benefit of knowing where the light is coming from, yet they do not experience the discomfort of glare which accompanies normal direct lighting. When the luminaire of the present invention is mounted to the top of a movable wall panel at a height of 72 to 84 inches, the light source is out of the direct line of sight of a person less than about seven feet tall. Nevertheless, he is capable of seeing light emanating from the exit surfaces of the prisms on the curved lateral portions of the lens. A small amount of light also emanates from the riser surfaces of the prisms through internal reflection, and this light is greatly diminished in luminance, but it extends downwardly from the luminaire, thereby providing a visual image of the source of light even to a person sitting at a work surface mounted to the same or adjacent wall panel to which the luminaire is mounted.

Another advantage to the present invention is that the lens provides a dust cover for the lamps, and the smooth exterior surface of the upper portion of the lens facilitates cleaning. That is, are no crevices in which dust can gather. Thus, a major source of reduction of luminance in indirect lighting is obviated, namely, the collection of dust on the lens or lamps.

Other features and advantages of the invention will be apparent to persons skilled in the art from the following detailed description of a preferred embodiment accompanied by the attached drawing wherein identical reference numerals will refer to like parts in the various views.

THE DRAWINGS

DETAILED DESCRIPTION

Figure 1:
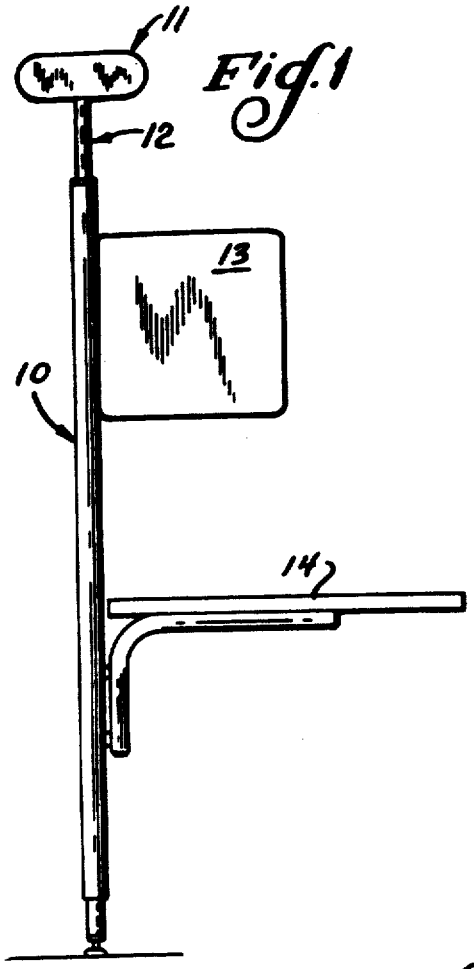
FIG. 1 is a side elevational view of a typical movable panel wall system on which a luminaire constructed according to the present invention is mounted.

Referring first to FIG. 1, reference numeral 10 generally designates a movable wall panel at the top of which a luminaire generally designated 11 is mounted by means of an upright mount 12 extending from the top of the panel 10. The amount 12 may take the form of a pair of upright arms enclosed in a sheet metal casing.

To illustrate the type of task lighting to which the present invention is directed, a cabinet generally designated 13 may be mounted to the wall panel 10, and a work surface 14 may be provided beneath the cabinet 13.

Figure 2:
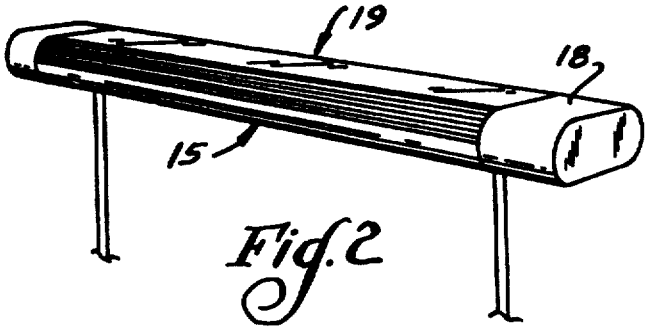
FIG. 2 is an upper side perspective view of the luminaire of FIG. 1.

Turning now to FIG. 2, the fixture 10 is seen to include a housing 15, first and second end caps 17, 18, and an upper lens 19.

Figure 3:
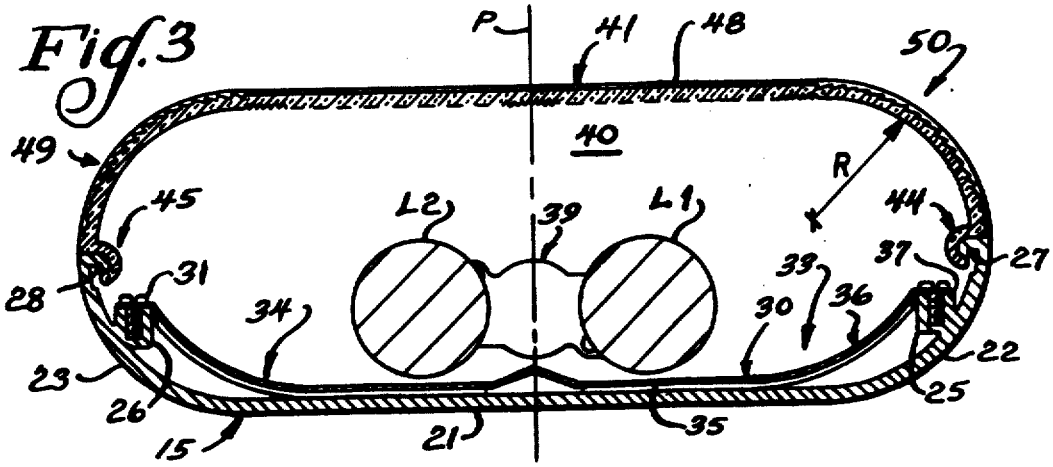
FIG. 3 is a transverse cross sectional view of the luminaire of FIG. 2.

As best seen in FIG. 3, the housing 15 includes a generally flat bottom wall 21 and upwardly curved side walls 22, 23. The housing 15 may be formed by extruded aluminum since its cross section is uniform throughout. It is then cut to the desired length.

On the side wall portion 22, there is formed a screw mount 25, and a similar screw mount 26 is formed on the inner surface of the side wall 23. First and second inwardly extending lips 27, 28 are formed at the upper edges of the side walls 22, 23 respectively.

A reflector generally designated 30 is mounted in the housing 15 by screws 31 secured in the screw mounts 25, 26. The reflector 30 is symmetrical about a vertical plane P extending through the longitudinal center of the luminaire to form side halves 33, 34. Thus, the side 33 includes a flat portion 35 beneath a first lamp L1; and to the side of the lamp L1, the reflector is smoothly curved upwardly to form a portion 36, the edge of which is formed into a mounting flange 37. The central portion of the reflector is turned upwardly as at 39. The surface of the reflector may vary according to the effect desired, but for general office use, a specular surface may be used.

The illustrated embodiment includes a second lamp L2 located within the housing 22. Both lamps are mounted between a pair of conventional lamp holders, one of which is shown in FIG. 3 at 39 mounted to a first intermediate wall 40. A third lamp may be used by moving the two lamps shown further apart and inserting a third lamp between them. The center lamp would be raised slightly. The luminaire may also be used with only a single lamp or with a switch for illuminating one, two or three lamps, as desired.

A lens generally designated 41 is mounted to the housing 15 by means of first and second elongated fittings 44, 45 which releasably couple respectively to the inwardly extending lips 27, 28 of the housing 15. Thus, the lens is mounted in such a manner that it can be removed easily, simply by pressing the sides, yet it prevents dust and dirt from entering the interior of the luminaire. The end seals will be described in connection with FIG. 4.

The lens 41 includes an upper lens portion 48, and first and second curved lateral portions 49, 50. The lens 41 is also symmetrical about the plane P. Because both side halves of the fixture operate in a similar manner, the features and advantages of the invention can be achieved simply be extending the housing along the plane P for a luminaire adapted to mount to the vertical surface of a wall, such as in a hall or conference room, as distinguished from the botton-mounted luminaire shown.

Figure 4:
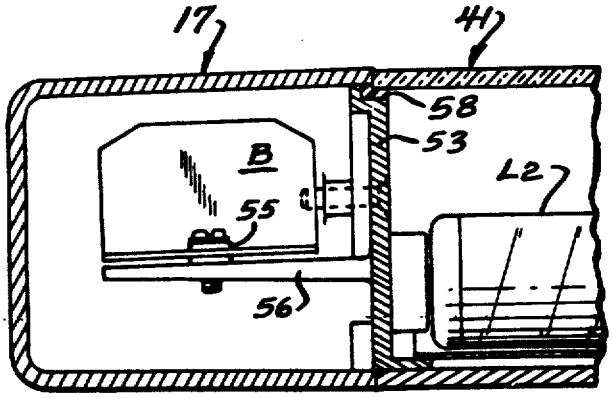
FIG. 4 is a fragmentary longitudinal vertical cross sectional view of one end of the luminaire of FIG. 2.

Referring now to FIG. 4, the end cap 17 is seen in detail. It is received on and held to an intermediate wall 53 which serves to mount the lamps and also to support a ballast B in the manner illustrated. Thus, the end cap 17 cooperates with the intermediate wall 53 to provide a housing for the ballast B which may be mounted by means of a flexible grommet 55 to a platform 56 cantilevered from the intermediate wall 53 to reduce noise transmission from the ballast B.

In FIG. 4, there is also shown a gasket 58 which seals the left edge of the lens 41 against the entry of dust into the interior of the luminaire. A similar gasket is provided on the other intermediate wall 40.

Figure 5:
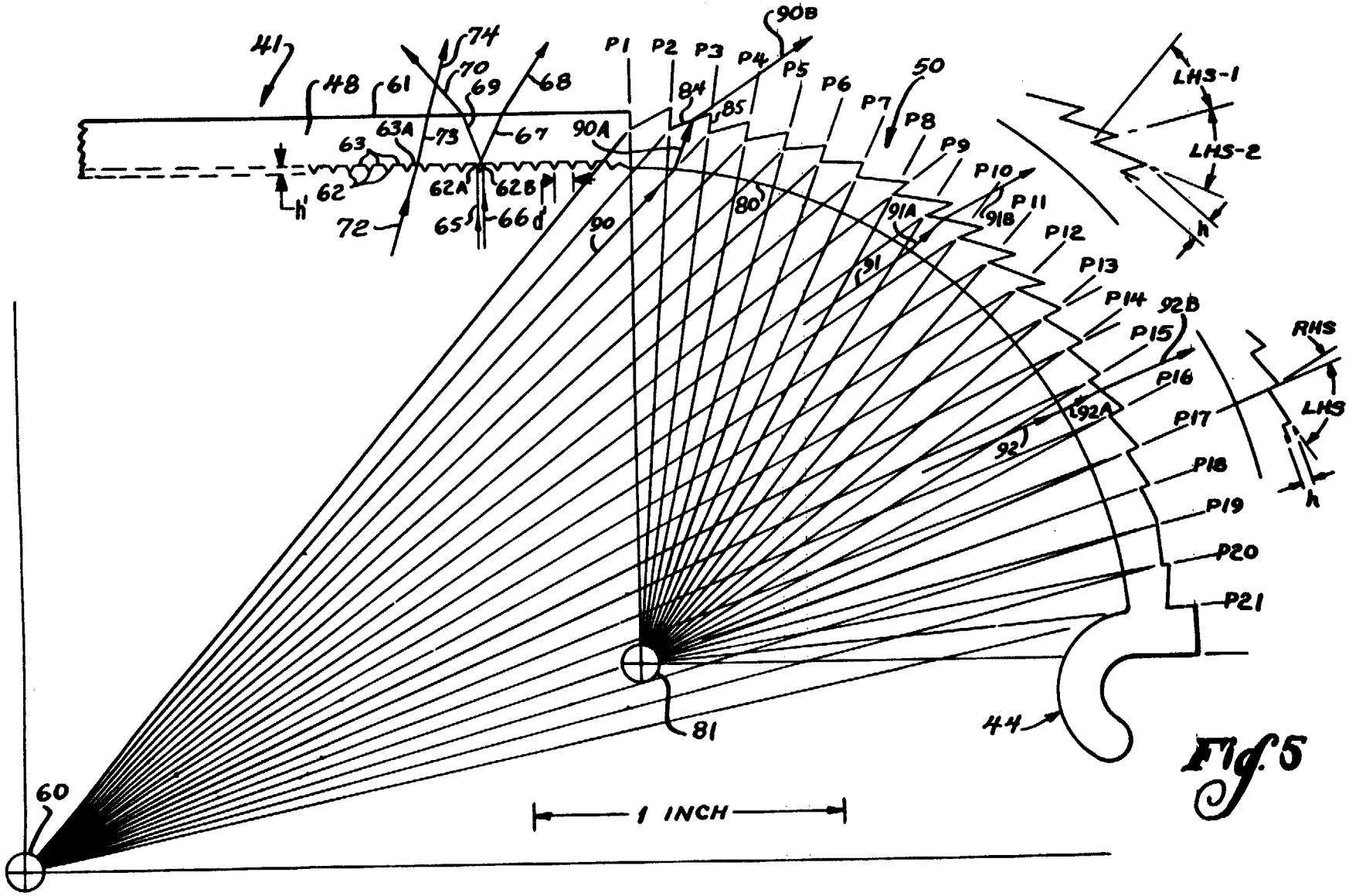
FIG. 5 is a diagrammatic cross sectional view of the right side of a lens incorporated into the luminaire of FIG. 2.

Turning now to FIG. 5, which illustrates the structure of one side of the lens 41 in relation to the center of lamp L1, designated 60 in FIG. 5, the top portion 48 of the lens has a flat upper surface designated 61. This facilitates dusting of the fixture and provides no crevices for collecting dust or dirt. The under surface of the top portion 48 of the lens 41 is formed into a plurality of equilateral prisms 62 which extend the length of the lens, and are separated by flat portions or simply "flats" designated 63.

The principal function of the prisms 62 is to cause incident light to diverge through refraction. Consider, for example, parallel incident rays 65, 66 which are incident respectively on the surfaces 62A and 62B. The ray 65 is refracted and travels along the path 67 through the transparent material of the lens to the upper exit surface 61 thereof where it is again refracted ray 66 follows the path 69 in the lens and emerges along the path 70 from the exit surface 61. Thus, the light which is incident on the surfaces of the prisms 62 is widely dispersed and diverged through refraction.

Light which is incident on one of the flats 63, on the other hand, is simply displaced but remains parallel to the path of the original incident ray. Consider, for example, the ray 72 which is incident on a land designated 63A. It travels along a path 73 within the lens material, but emerges from the exit surface 61 to travel along a path 74 which is parallel to the path of the original ray 72. Because of the size, configuration and spacing of the prisms, the light emerging from the exit surface 61 is diverged in such a manner that the resulting pattern of luminance on a horizontal surface above the luminaire for as close a spacing as one foot is substantially uniform without either bright or dark areas.

In a preferred embodiment, the angle of each of the prisms 62 is 60 degrees; and the height h' is 30 mils. The spacing d' of the prisms is 62 mils, and the thickness of the lens 41 between the exit surface 61 and the flats 63 is 130 mils. These dimensions can be changed without any appreciable change in the results. If the proportion of prisms height to spacing remains the same, the results will be the same. The material of the lens preferably is clear virgin acrylic, although other materials such as Lexon may also be used.

Turning now to the lateral portion 50 of the lens, its principal function is to bend incident light from the source and to "fan" the light out laterally so that it is spread to the side of the fixture on a ceiling and may also be used to illuminate any vertical surfaces in the neighboring vicinity. Because of the reduction in intensity due to the greater distance traveled by the light passing through the lateral portion 50 as well as the fact that the flux will be spread over a greater area of any illuminated horizontal surface due to the increased angle of incidence, a principal function of the reflector 30 and particularly the curvature of the portion 36 is to direct light from the source L1 toward the lateral portion 50 of the lens.

The lateral lens portion 50 of the lens has a uniformly curved, smooth interior surface 80 which has a radius of curvature R centered at 81. The outer surface of the lateral portion 50 of the lens is formed into a plurality of prisms, the points of which are designated respectively P1–P21 for convenience.

Each of the prisms P1–P21 includes an active or emitting surface such as that designated 84 for the prisms P3 from which light incident on the inner surface 80 will emerge, and a second surface 85 referred to as a riser or return surface. The structure of the prisms P1–P21 is illustrated in Table I where the angles RHS, LHS, LHS-1 and LHS-2 are defined in FIG. 5. The dimension "h" is the height of a prism. The nominal thickness of the lateral portion 50 from the uniformly curved surface 80 to the intersection between an adjacent riser 85 of one prism and the active surface of the adjacent prism is 125 mils. Further, the center 60 of the light source is approximately 0.625 inches below the center 81 of the radius of curvature of the surface 80, and approximately two inches to the left of it. It will also be observed that the center 81 is in approximately the same horizontal plane as the upper extension of the curved side 22 of the opaque housing 15. Thus, the light sources cannot be seen directly by an observer whose eye level is the same height as the source.

Because the luminaries are preferably mounted at a height of six to seven feet above the floor (that is, the height to the top of the side wall 22 of the housing 15), a person who is less than about seven feet tall will have a line of sight which will be above the lamps. However, as will be explained presently, he will perceive where the light is coming from.

Still referring to FIG. 5, three light rays are designated 90, 91 and 92; and for purposes of illustration, they are shown as emanating from the center 60 which is an idealized point. In the medium of the lens, the rays take the respective paths 90A, 91A and 92A; and when they exit from the associated active surfaces of the prisms as illustrated, they travel along the paths 90B, 91B and 92B respectively. It can thus be seen that the light from the source is spread out in an increasing pattern from the top to the side edge of the lateral portion 50 of the lens. Further, it is segmented in the sense that an observer viewing the lens from the side at normal angles will see a series of softly glowing horizontal lines and therefore perceive where the light is emanating from. Not illustrated in FIG. 5 for clarity are the rays of light emanating from the source L1 which are reflected by the reflector 30 and directed toward the lateral portion 50 of the lens. As indicated, these rays reinforce the direct rays from the source so that the pattern of luminance on a horizontal surface above the fixture will be substantially uniform and without glare spots or dark areas not only directly above the luminaire but also for a distance of several feet to the side thereof. By providing uniform ambient lighting, as mentioned above, the overall luminance can be maintained at a relatively low level and yet provide adequate task lighting. By bending the light and fanning it out laterally through the lateral portions of the lens, the luminaires can be placed at relatively greater distances than would otherwise be required to achieve complete illumination coverage and uniform luminance. Vertical surfaces in a room employing these luminaires are also illuminated in a substantially uniform manner even at eye level and above, because of light directed from the lateral lens portions and reflected off the ceiling. As mentioned, human perception of whether a room is adequately lighted depends to some extent on whether the vertical surfaces are visibly illuminated.

Still further, it will be appreciated that the lens acts as a dust cover to prevent dust and dirt from reducing the luminance emanating from the source, and because of the upper surface of the top portion of the lens is flat, it facilitates cleaning. It will be observed that at least some light emanates from the riser surfaces of the prisms on the lateral portion of the lens, and this light is directed downwardly below the horizontal. It may not be enough light to provide adequate task lighting but it nevertheless provides a visual image to an observer seated at a work area so that he can see where the light is coming from.

Having thus described in detail a preferred embodiment of the invention, persons skilled in the art will be able to modify certain of the structure which has been illustrated and substitute equivalent elements for those disclosed while continuing to practice the principle of the invention. For example, the dimensions of the lens may be altered without substantially changing the photometric properties of the luminaire, particularly, if the height-to-spacing proportions of the various prisms is maintained. Further, although flourescent lamps are preferred, other lamps may also be used; and lamps not yet developed may have equal or better results. Finally, the number of lamps or type of ballast are not critical to achieving the overall desired results. It is, therefore, intended that all such modifications and substitutions be covered as they are embraced within the spirit and scope of the appended claims.

TABLE I

| POINT | 1 | 2 | 3 | 4 | 5 | 6 | 7 |
|---|---|---|---|---|---|---|---|
| RHS | 0 | 0 | 0 | 0 | 0 | 0 | 0 |
| LHS | 63.9 | 65.2 | 66.4 | 67.6 | 68.8 | 70.0 | 71.1 |
| h | .070 | .067 | .063 | .060 | .057 | .054 | .066 |
| POINT | 8 | 9 | 10 | 11 | 12 | 13 | 14 |
| LHS-1 | 24.1 | 33.3 | 33.3 | 33.3 | 33.3 | 12.1 | 9.8 |
| LHS-2 | 69.0 | 69.0 | 69.0 | 69.0 | 67.8 | 70.4 | 73.0 |
| h | .082 | .082 | .082 | .082 | .070 | .058 | .047 |
| POINT | 15 | 16 | 17 | 18 | 19 | 20 | 21 |
| RHS | 0 | 0 | 0 | 0 | — | 87.2 | 82.5 |
| LHS | 70.0 | 74.2 | 78.8 | 83.4 | — | 0 | 1.25 |
| h | .054 | .044 | .034 | .017 | — | .017 | .025 |

What we claim is:

1. A luminaire for indirect lighting comprising
a source of light,
an opaque housing extending upwardly about said-light source, and
lens means mounted above said housing,
said lens means being formed to permit light from said light source to be directed to a horizontal surface above said luminaire to provide a directly overhead luminance pattern thereon, and
said lens means further including a lateral lens portion having a prismatic surface for collecting a portion of the light from said light source, *said lateral lens portion extending generally upwardly above said housing so as to be in the field of view of persons located below and to the side of said luminaire, and* said prismatic surface of said lateral lens portion being formed to refract substantially all of said collected light laterally of said luminaire so as to spread same away from said directly overhead luminance pattern to provide a laterally extended overhead distribution of light.

2. The luminaire of claim 1 wherein said opaque housing is elongated and the lateral lens portion of said lens means includes a plurality of prisms extending longitudinally of said luminaire for substantially the length of said luminaire.

3. The luminaire of claim 2 wherein the prisms of said lateral lens portion are defined by an active surface for refracting incident source light and a return surface.

4. The luminaire of claim 2 wherein said lens means is a trough shaped lens cover.

5. The luminaire of claim 2 wherein said lens means includes two lateral lens portions symmetrically positioned about a vertical plane passing through the center of said housing for spreading collected portions of source light laterally away from both sides of said luminaire.

6. The luminaire of claim 5 wherein said light source includes fluorescent lamps symmetrically positioned above the vertical center plane of said housing.

7. The luminaire of claim 2 wherein the lateral lens portion has a curved surface with a radius of curvature smaller than the distance between said curved surface and said source.

8. The luminaire of claim 7 wherein the prisms of said lateral lens portion have a plurality of prism points on the outside surface thereof substantially defined by the following table:

TABLE

| POINT | 1 | 2 | 3 | 4 | 5 | 6 | 7 |
|---|---|---|---|---|---|---|---|
| RHS | 0 | 0 | 0 | 0 | 0 | 0 | 0 |

TABLE-continued

| | | | | | | | |
|---|---|---|---|---|---|---|---|
| LHS | 63.9 | 65.2 | 66.4 | 67.6 | 68.8 | 70.0 | 71.1 |
| h | .070 | .067 | .063 | .060 | .057 | .054 | .066 |
| POINT | 8 | 9 | 10 | 11 | 12 | 13 | 14 |
| LHS-1 | 24.1 | 33.3 | 33.3 | 33.3 | 33.3 | 12.1 | 9.8 |
| LHS-2 | 69.0 | 69.0 | 69.0 | 69.0 | 67.8 | 70.4 | 73.0 |
| h | .082 | .082 | .082 | .082 | .070 | .058 | .047 |
| POINT | 15 | 16 | 17 | 18 | 19 | 20 | 21 |
| RHS | 0 | 0 | 0 | 0 | — | 87.2 | 82.5 |
| LHS | 70.0 | 74.3 | 78.8 | 83.4 | — | 0 | 1.25 |
| h | .054 | .044 | .034 | .017 | — | .017 | .025 |

where RHS defines the angle between the return surface and radial, for prisms where the return surface falls on or to the right hand side of the radial when viewed from the exterior of the lens, where LHS defines the angle between the emitting surface and radial where there exists an RHS angle, where LHS-1 defines the angle between the return surface and radial where the return surface falls on or to the left hand side of the radial where viewed from the exterior of the lens, where h is the height in inches of the prisms.

9. The luminaire of claim 1 wherein said lens means further includes an upper lens portion formed to disperse incident source light generally upwardly for producing on said horizontal surface a directly overhead substantially uniform luminance pattern.

10. The luminaire of claim 9 wherein said lens means is a substantially trough shaped lens.

11. The luminaire of claim 9 wherein said upper lens portion includes a plurality of prisms extending longitudinally of said luminaire for substantially the length of said light source.

12. The luminaire of claim 11 wherein said prisms on said upper lens portion are substantially equilateral prisms.

13. The luminaire of claim 12 wherein said prisms on said upper lens portion are separated by flats.

14. A luminaire for indirect lighting comprising a source of light, an elongated opaque housing extending upwardly about said light source, an elongated substantially trough shaped lens mounted above said housing to cover said light source, said lens being substantially symmetrical about a vertical plane passing through the center of said housing, and said lens having a upper lens portion formed to disperse source light to a horizontal surface above said luminaire to produce a substantially uniform luminance pattern thereon directly overhead said luminaire, and said lens further having two opposed curved lateral lens portions each of which is formed to collect a portion of the light from said light source and each of which has a plurality of prisms extending longitudinally of said luminaire and distributed substantially over the extent of said lateral lens portion, said plurality of prisms of each of said lateral lens portions being formed to refract substantially all said collected portion of light laterally of said luminaire so as to spread same away from said directly overhead luminance pattern to provide a laterally extended overhead distribution of light to each side of said luminaire.

15. The luminaire of claim 14 wherein said light source includes fluorescent lamps symmetrically positioned about said vertical center plane.

16. A luminaire for indirect lighting comprising a source of light, an opaque housing extending upwardly about said light source to form at least one opaque sidewall, said light source being positioned substantially below said sidewall, and lens means mounted above said housing, said lens means being formed to permit light from said light source to be directed to a horizontal surface above said luminaire to provide a directly overhead luminance pattern thereon, and said lens further including a lateral lens portion having a prismatic surface for collecting a portion of the light from said light source and refracting substantially all of said collected light laterally of said luminaire so as to spread same away from said directly overhead luminance pattern to provide a laterally extended overhead distribution of light, said prismatic surface being formed at least in part to refract substantially all of the source light collected by said part closer to a horizontal direction.

17. The luminaire of claim 16 wherein said opaque housing is elongated and the lateral lens portion of said lens means includes a plurality of prisms extending longitudinally of said luminaire for substantially the length of said luminaire.

18. The luminaire of claim 17 wherein the prisms of said lateral lens portion are defined by an active surface for refracting incident source light and a return surface.

19. The luminaire of claim 18 wherein said lens means further includes an upper lens portion formed to disperse incident source light generally upwardly for producing on said horizontal surface a directly overhead substantially uniform luminance pattern.

20. The luminaire of claim 19 wherein said upper lens portion includes a plurality of prisms extending longitudinally of said luminaire for substantially the length of said luminaire.

21. The luminaire of claim 20 wherein said lens means is a trough shaped lens.

22. A luminaire for indirect lighting comprising a source of light, an elongated opaque housing extending upwardly about said light source to form opposed opaque housing sidewalls on either side of said light source, said light source being positioned substantially below said sidewalls, and an elongated substantially trough shaped lens mounted above said housing to cover said light source, said lens being substantially symmetrical about a vertical plane passing through the center of said housing, said lens including two opposed longitudinally extending lateral lens portions each of which has a prismatic surface for collecting a portion of the light from said light source and refracting substantially all of said collected light laterally of said luminaire so as to spread same away from said directly overhead luminance pattern to provide a laterally extended overhead distribution of light to each side of said luminaire, said prismatic surface being formed at least in part to refract substantially all of the source light collected by said part closer to a horizontal direction.

23. The luminaire of claim 22 wherein said luminaire has two fluorescent lamps symmetrically postioned about the vertical center plane of said housing.

24. The luminaire of claim 22 wherein said symmetrically positioned fluorescent lamps consist of three fluorescent lamps with one of said lamps being positioned at said vertical center plane.

25. A luminaire for indirect lighting comprising a source of light, an opaque housing extending upwardly about said light source to form at least one opaque sidewall, and lens means mounted above said housing, said lens means being formed to permit light from said light source to be directed to a horizontal surface above said luminaire to provide a directly overhead luminance patter thereon, and said lens means including a lateral lens portion which extends generally upwardly from said opaque sidewall and which has a prismatic surface for collecting a portion of the light from said light source, said prismatic surface of said lateral lens portion being formed to refract substantially all of said collected light laterally of said luminaire so as to spread same away from said directly overhead luminance pattern to provide a laterally extended substantially uniform overhead distribution of light.

26. The luminaire of claim 25 wherein said upwardly extending lateral lens portion lies on a radius of curvature centered within said housing.

27. The luminaire of claim 25 wherein said opaque housing is elongated and the lateral lens portion of said lens means includes a plurality of prisms extending longitudinally of said luminaire for substantially the length of said luminaire.

28. The luminaire of claim 27 wherein the prisms of said lateral lens portion are defined by an active surface for refracting incident source light and a return surface.

29. The luminaire of claim 28 wherein said housing extends upwardly about both sides of said light source to form two opaque housing sidewalls and wherein said lens means is a substantially trough shaped lens wherein two opposed lateral lens portions are provided, one on either side of said trough shape lens.

* * * * *